US012334290B2

(12) United States Patent
Shibuya et al.

(10) Patent No.: US 12,334,290 B2
(45) Date of Patent: Jun. 17, 2025

(54) RELAY CONTROL APPARATUS

(71) Applicants: Yazaki Corporation, Tokyo (JP); GS Yuasa International Ltd., Kyoto (JP)

(72) Inventors: Masaki Shibuya, Makinohara (JP); Takuya Oki, Makinohara (JP); Kyohei Yamamoto, Makinohara (JP); Shoichi Arimoto, Kyoto (JP); Ryuichi Ito, Kyoto (JP); Kentaro Ushio, Kyoto (JP)

(73) Assignees: YAZAKI CORPORATION, Tokyo (JP); GS YUASA INTERNATIONAL LTD., Kyoto (JP)

( * ) Notice: Subject to any disclaimer, the term of this patent is extended or adjusted under 35 U.S.C. 154(b) by 150 days.

(21) Appl. No.: 18/337,969

(22) Filed: Jun. 20, 2023

(65) Prior Publication Data

US 2024/0029981 A1 Jan. 25, 2024

(30) Foreign Application Priority Data

Jul. 25, 2022 (JP) ................................ 2022-117783

(51) Int. Cl.
*H01H 9/00* (2006.01)
*H01H 47/00* (2006.01)
*H01H 47/04* (2006.01)
*H01H 47/22* (2006.01)

(52) U.S. Cl.
CPC .................................. *H01H 47/22* (2013.01)

(58) Field of Classification Search
CPC .... H01H 47/22; H01H 47/226; H01H 47/002; H01H 47/009; E05B 47/00
USPC .......................................................... 361/206
See application file for complete search history.

(56) References Cited

U.S. PATENT DOCUMENTS

| | | | | |
|---|---|---|---|---|
| 4,505,600 A * | 3/1985 | Suzuki | G01K 7/20 374/170 |
| 2015/0001924 A1* | 1/2015 | Kamiya | H01H 47/001 307/9.1 |
| 2019/0242156 A1* | 8/2019 | Schlezinger | E05B 47/0002 |

FOREIGN PATENT DOCUMENTS

| | | |
|---|---|---|
| JP | 2017-017642 A | 1/2017 |

* cited by examiner

*Primary Examiner* — Jared Fureman
*Assistant Examiner* — Lucy M Thomas
(74) *Attorney, Agent, or Firm* — Sughrue Mion, PLLC

(57) ABSTRACT

A relay control apparatus for controlling a latching relay including a closing side coil and an opening side coil, the relay control apparatus including a power supply control unit including a power supply resistor and a power supply switch, a relay close control unit including a relay close switch, a relay open control unit including a relay open switch, a voltage detection unit configured to output a voltage signal, and a control unit configured to output a power supply signal for controlling ON/OFF of the power supply switch, a relay close signal for controlling ON/OFF of the relay close switch, a relay open signal for controlling ON/OFF of the relay open switch, and a detection signal for controlling ON/OFF of the voltage detection switch, the control unit being configured to detect malfunction based on the power supply signal, the relay close signal, the relay open signal, the detection signal, and the voltage signal.

4 Claims, 5 Drawing Sheets

FIG. 2

| | | VOLTAGE DETECTION UNIT | POWER SUPPLY CONTROL UNIT | RELAY CLOSE CONTROL UNIT | RELAY OPEN CONTROL UNIT | NORMAL VOLTAGE RANGE |
|---|---|---|---|---|---|---|
| A | DIAGNOSIS INITIAL STATE | OFF | OFF | OFF | OFF | HIGH LEVEL |
| B | VOLTAGE DETECTION UNIT DURING DIAGNOSIS | ON | OFF | OFF | OFF | MID LEVEL |
| C | POWER SUPPLY CONTROL UNIT DURING DIAGNOSIS | ON | ON | OFF | OFF | HIGH LEVEL |
| D | RELAY CLOSE CONTROL UNIT DURING DIAGNOSIS | ON | OFF | ON | OFF | LOW LEVEL |
| E | RELAY OPEN CONTROL UNIT DURING DIAGNOSIS | ON | OFF | OFF | ON | LOW LEVEL |

RELAY CONTROL APPARATUS

TECHNICAL FIELD

The present invention relates to a relay control apparatus that controls a latching relay.

BACKGROUND

In vehicles equipped with a battery, a latching relay that can maintain an open/closed state without being energized is widely used as a relay for switching the state of power supply from the battery to the load side.

In general, a latching relay has an opening side coil and a closing side coil, and controls the current so that it flows through one of the coils only when switching between opening and closing. Therefore, in the relay control apparatus for controlling the latching relay, a power source is connected to each coil via a switch, and one switch is turned on when switching between opening and closing. As a result, one of the coils is energized and the latching relay opens or closes.

If a malfunction such as a switch short-circuit occurs in the relay control apparatus, it will interfere with the opening or closing control of the latching relay. Accordingly, as described in Patent Document 1, the relay control apparatus is required to implement a malfunction diagnosis function. The relay control apparatus equipped with the malfunction diagnosis function often performs self-diagnosis at a timing different from the normal operation of a latching relay, and for example, it can detect malfunction by turning ON and OFF the switch and measuring the current flowing through the coil at that time.

RELATED ART

Patent Document

Patent Document 1
Japanese Patent Application Publication No. 2017-17642

SUMMARY OF THE INVENTION

Problem to be Solved by the Invention

However, when the switch is turned ON and OFF for malfunction diagnosis, the latching relay opens and closes every time the malfunction diagnosis is performed. In addition to wearing due to the opening and closing operation, a power latching relay used for power supply from the battery to the load side can be a noise source because it emits a considerable operating sound during the opening and closing operation. Therefore, it is preferable to reduce the opening and closing operations of the latching relays other than during normal operation.

Accordingly, it is an object of the present invention to provide a relay control apparatus capable of alleviating opening and closing operations of a latching relay during malfunction diagnosis.

Solution to Problem

In order to solve the above-described problems, a relay control apparatus according to one aspect of the present invention is a relay control apparatus for receiving a supply of power and controlling a latching relay including a closing side coil and an opening side coil, the relay control apparatus comprising:

- a power supply control unit including a power supply resistor and a power supply switch connected in parallel between a first electrode and a connection point between a first end of the closing side coil and a first end of the opening side coil;
- a relay close control unit including a relay close switch connected between a second electrode and a second end of the closing side coil;
- a relay open control unit including a relay open switch connected between the second electrode and a second end of the opening side coil;
- a voltage detection unit including a voltage detection resistor and a voltage detection switch connected in series between the connection point and the second electrode, the voltage detection unit being configured to output a voltage signal based on a voltage of the connection point; and
- a control unit configured to output a power supply signal for controlling ON/OFF of the power supply switch, a relay close signal for controlling ON/OFF of the relay close switch, a relay open signal for controlling ON/OFF of the relay open switch, and a detection signal for controlling ON/OFF of the voltage detection switch, the control unit being configured to detect malfunction based on the power supply signal, the relay close signal, the relay open signal, the detection signal, and the voltage signal.

In this case, a normal voltage range is defined for each combination of states of the power supply signal, the relay close signal, the relay open signal, and the detection signal, and in a case where the voltage signal is determined to be out of the normal voltage range, the control unit can determine an occurrence of malfunction.

Furthermore, the power supply resistor preferably has such a value that a current is limited to such a degree that the latching relay does not operate even when the relay close switch or the relay open switch is switched to an ON state while the power supply switch is in an OFF state.

The relay control apparatus according to one aspect of the present invention is capable of alleviating opening and closing operations of a latching relay during malfunction diagnosis.

BRIEF DESCRIPTION OF THE DRAWINGS

FIG. 2 is a diagram illustrating a correspondence between a control signal and a normal voltage range for each operation;

DETAILED DESCRIPTION OF THE EXEMPLARY EMBODIMENT

Figure 1:
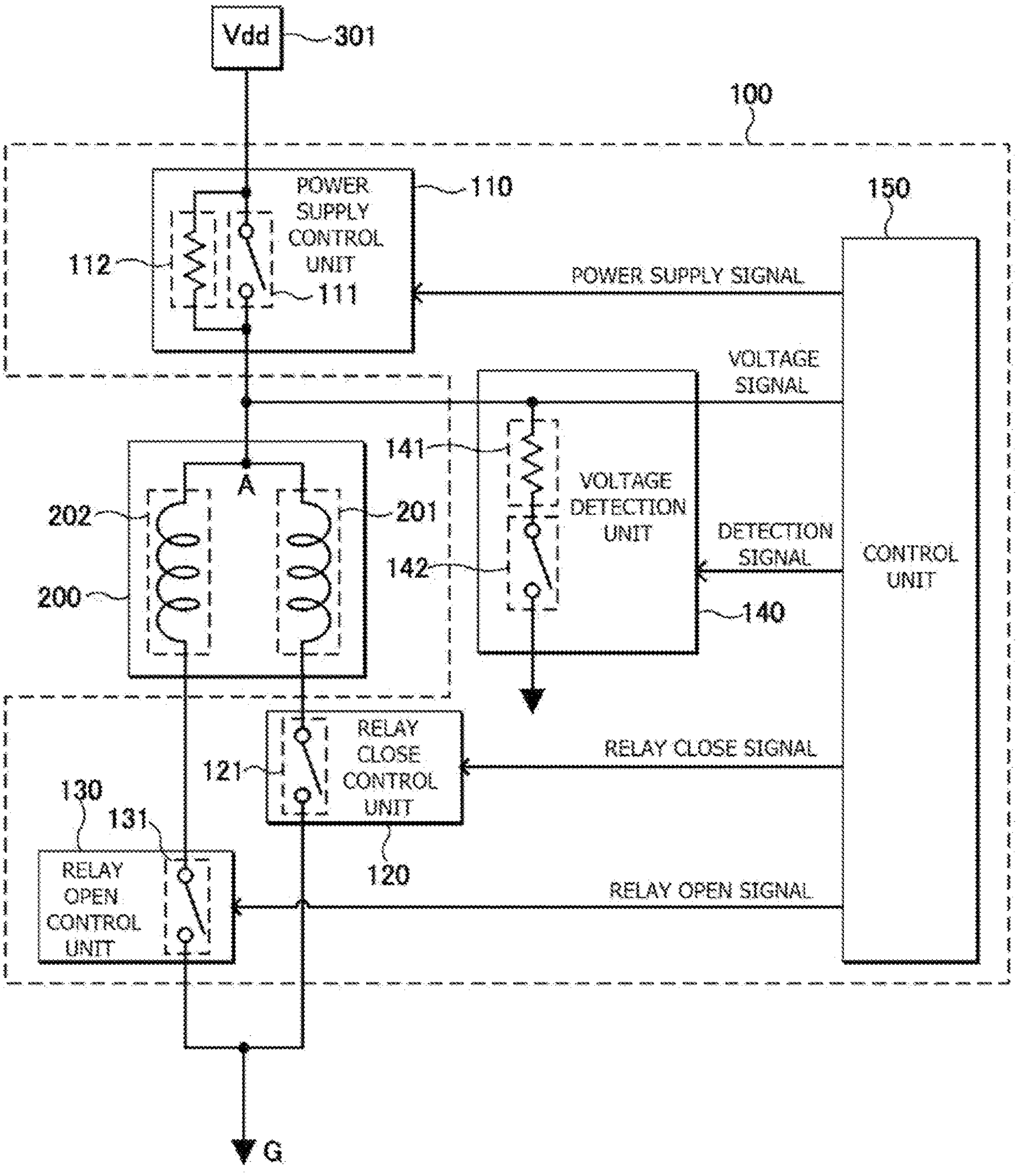
FIG. 1 is a block diagram illustrating a relay control apparatus according to the present embodiment.

An embodiment of the present invention will be described in detail with reference to the drawings. FIG. 1 is a block diagram illustrating a relay control apparatus 100 according to an embodiment of the present invention. The relay control apparatus 100 is an apparatus that receives power from the outside and controls the opening and closing operations of the latching relay 200. A power supply line is formed by a power supply 301 and a ground G.

Here, the latching relay 200 has a closing side coil 201 that is energized during a closing operation and an opening side coil 202 that is energized during an opening operation. A first end of the closing side coil 201 on the side of the power supply 301 and a first end of the opening side coil 202 on the side of the power supply 301 are connected at a connection point A. A second end of the closing side coil 201 on the side of the ground G and a second end of the opening side coil 202 on the side of the ground G are independent. Mechanisms other than the coil provided in the latching relay 200, such as a movable contact and a fixed contact, are omitted in this figure. In this example, the first electrode, i.e., an electrode with which the relay control apparatus 100 receives power, is the power supply 301, and the second electrode is the ground G. However, the first electrode may be a positive electrode and the second electrode may be a negative electrode.

As illustrated in the drawing, the relay control apparatus 100 includes a power supply control unit 110, a relay close control unit 120, a relay open control unit 130, a voltage detection unit 140, and a control unit 150.

The power supply control unit 110 is provided between the connection point A and the power supply 301 and includes a power supply switch 111 and a power supply resistor 112 connected in parallel. The power supply switch 111 can be composed of, for example, a pMOSFET, and is turned ON and OFF based on the power supply signal from the control unit 150. When the power supply switch 111 is in the ON state, the connection point A and the power supply 301 are connected through a parallel circuit of the power supply switch 111 and the power supply resistor 112. In this case, the influence of the power supply resistor 112 is extremely small. When the power supply switch 111 is in the OFF state, the power supply resistor 112 can generate the voltage required for malfunction detection.

The relay close control unit 120 is provided between the second end of the closing side coil 201 and the ground G, and has a relay close switch 121 for switching the connection state between them. The relay close switch 121 can be composed of, for example, an nMOSFET, and turns ON and OFF based on the relay close signal from the control unit 150.

The relay open control unit 130 is provided between the second end of the opening side coil 202 and the ground G, and has a relay open switch 131 for switching the connection state between them. The relay open switch 131 can be composed of, for example, an nMOSFET, and turns ON and OFF based on the relay open signal from the control unit 150.

The voltage detection unit 140 detects the voltage of the connection point A, and outputs the voltage to the control unit 150 as a voltage signal. The voltage detection unit 140 includes a voltage detection resistor 141 and a voltage detection switch 142 connected in series between the connection point A and the ground. The voltage detection switch 142 can be composed of an nMOSFET, for example, and turns ON and OFF based on the detection signal from the control unit 150.

With the voltage detection switch 142 turned ON, the connection point A is grounded through the voltage detection resistor 141, and the voltage generated at the voltage detection resistor 141 is output as the voltage signal. Since this path is not formed when the voltage detection switch 142 is OFF, the power consumption by the voltage detection resistor 141 can be reduced.

A value obtained by dividing the voltage of the connection point A may be output as the voltage signal. Also, a voltage sensor that measures the voltage of the connection point A may be provided, and a value based on the measurement result may be output as the voltage signal.

The control unit 150 can be composed of, for example, of a microcomputer, and controls operations of the power supply control unit 110, the relay close control unit 120, the relay open control unit 130, and the voltage detection unit 140. The content of the control includes ON/OFF control of the power supply switch 111 of the power supply control unit 110, the relay close switch 121 of the relay close control unit 120, the relay open switch 131 of the relay open control unit 130, and the voltage detection switch 142 of the voltage detection unit 140.

When the relay close switch 121 or the relay open switch 131 is switched ON while the power supply switch 111 is in the OFF state, a current flows from the power supply 301 to the ground G through the power supply resistor 112. The power supply resistor 112 has a large value that limits the current to such a degree that the latching relay 200 does not operate at this occasion.

The relay control apparatus 100 has a diagnosis mode for performing self-diagnosis, and transitions to the diagnosis mode according to the control of the control unit 150. The diagnosis mode is a mode for detecting malfunction of the power supply control unit 110, the relay close control unit 120, the relay open control unit 130, and the voltage detection unit 140 through self-diagnosis, and performs an operation different from a normal opening and closing operation of the latching relay 200.

In the diagnosis mode, operations of the power supply control unit 110, the relay close control unit 120, the relay open control unit 130, and the voltage detection unit 140 are controlled according to a predetermined procedure. Specifically, malfunction diagnosis of each functional unit is performed by successively switching the states of control signals (a power supply signal, a relay close signal, a relay open signal, and a detection signal) that drive respective switches provided in the power supply control unit 110, the relay close control unit 120, the relay open control unit 130, and the voltage detection unit 140 to the ON or OFF state.

In the control unit 150, as illustrated in FIG. 2, the normal range of the voltage signal is predetermined in correspondence with a combination of control signals for respective functional units. The control unit 150 determines that a malfunction has occurred in the relay control apparatus 100 in a case where the voltage signal input from the voltage detection unit 140 is out of the normal voltage range corresponding to the combination of the ON/OFF control signals.

In the present embodiment, the voltage range is classified into three levels, i.e., a high level, a mid level, and a low level. The high level is a range approximately corresponding to the voltage of the power supply 301, the low level is a range approximately corresponding to the voltage of the ground G, and the mid level is a range therebetween. These voltage ranges are predetermined according to the voltage of the power supply 301, the values of the power supply resistor 112 and the voltage detection resistor 141, and the like. It is to be understood that the voltage signal may be appropriately level-shifted by voltage division or the like, and the voltage range can also be determined according to the level-shifted voltage signal.

Figure 3:
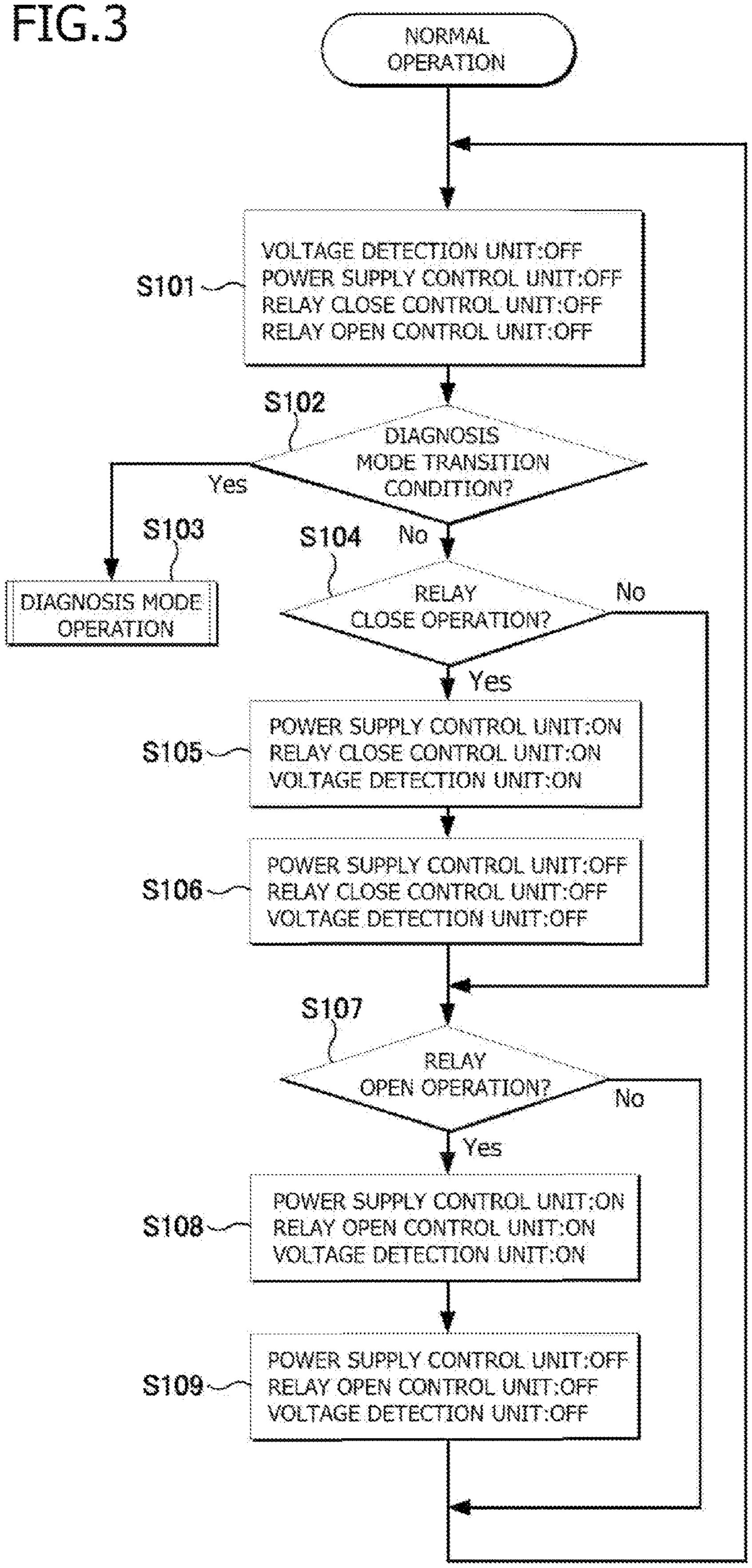
FIG. 3 is a flowchart illustrating a normal operation of the relay control apparatus.

Next, an operation of the relay control apparatus 100 configured as described above will be explained. First, the normal operation of the relay control apparatus 100, i.e., an operation other than diagnosis mode, will be described with reference to the flowchart of FIG. 3. This operation is performed according to control of the control unit 150.

In a standby state during the normal operation in which the latching relay 200 does not operate, the control unit 150 controls all of the power supply control unit 110, the relay close control unit 120, the relay open control unit 130, and the voltage detection unit 140 into the OFF state (S101). Accordingly, all of the power supply switch 111, the relay close switch 121, the relay open switch 131, and the voltage detection switch 142 are in the OFF state.

In a case where a transition condition to the diagnosis mode explained later is satisfied during the normal operation (S102: Yes), the diagnosis mode operation is performed (S103). The diagnosis mode operation is explained later in detail. When the diagnosis mode transition condition is not satisfied (S102: No), the normal operation continues.

In a case where the latching relay 200 is operated to be closed (S104: Yes), all of the power supply control unit 110, the relay close control unit 120, and the voltage detection unit 140 are controlled to the ON state (S105). Accordingly, the closing side coil 201 is energized, and the latching relay 200 is operated to be closed.

After a predetermined period of time in view of the closing operation time elapses, all of the power supply control unit 110, the relay close control unit 120, and the voltage detection unit 140 are controlled to the OFF state (S106). Even after the OFF control, the latching relay 200 maintains the closed state.

In a case where the latching relay 200 is operated to be opened (S107: Yes), all of the power supply control unit 110, the relay open control unit 130, and the voltage detection unit 140 are controlled to the ON state (S108). Accordingly, the opening side coil 202 is energized, and the latching relay 200 is operated to be opened.

After a predetermined period of time in view of the opening operation time elapses, all of the power supply control unit 110, the relay open control unit 130, and the voltage detection unit 140 are controlled to the OFF state (S109). Even after the OFF control, the latching relay 200 maintains the open state. Thereafter, returning to (S101), the closing operations and the opening operations are repeated as necessary.

In the normal operation, the normal voltage range is at a high level for both operations. The control unit 150 can determine that a malfunction has occurred in the relay control apparatus 100 in a case of detecting a voltage other than the high level in the normal operation.

Thus, the control unit 150 turns ON the power supply control unit 110 and the voltage detection unit 140 only during the opening and closing operation of the latching relay 200 during the normal operation of the relay control apparatus 100. This can reduce power consumption during the opening and closing operation is not performed.

Next, the operation in the diagnosis mode of the relay control apparatus 100 will be explained with reference to the flowcharts of FIGS. 4 and 5. This operation is performed according to the control of the control unit 150. For example, the relay control apparatus 100 can transition to the diagnosis mode when the relay control apparatus 100 is started, the relay control apparatus 100 can transition to the diagnosis mode in response to a request from another apparatus, or the relay control apparatus 100 can transition to the diagnosis mode after a predetermined period of time elapses since the previous diagnosis.

Figure 4:
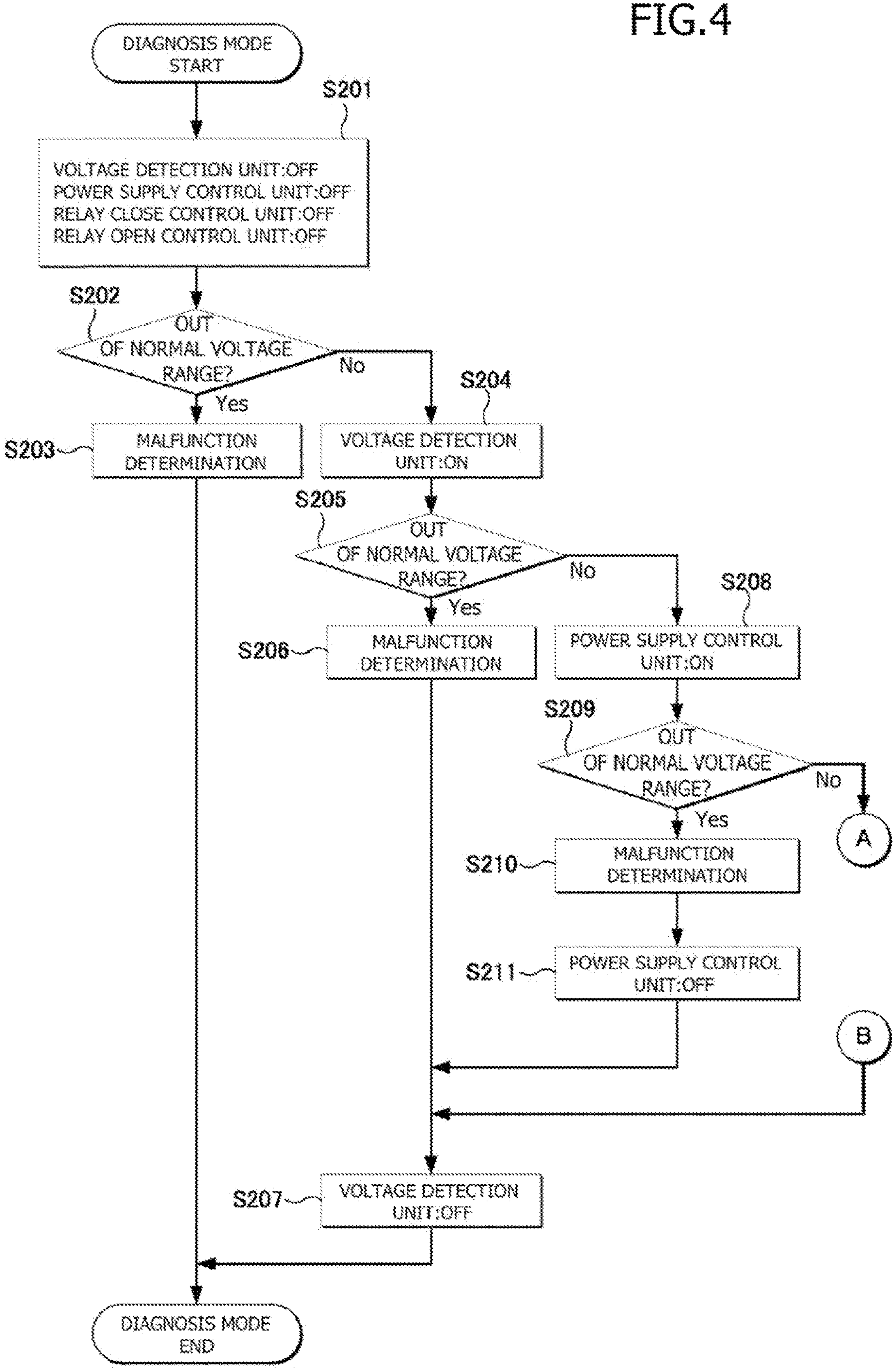
FIG. 4 is a flowchart illustrating a diagnosis mode operation of the relay control apparatus.

In the diagnosis mode, the control unit 150 turns OFF, as the initial state, all of the voltage detection unit 140, the power supply control unit 110, the relay close control unit 120, and the relay open control unit 130 (FIG. 4: S201).

In a case where no malfunction occurs in any of the functional units, no current flows from the power supply 301 to the ground G, and the voltage detection unit 140 detects a voltage substantially equal to the voltage of the power supply 301 through the power supply resistor 112 of the power supply control unit 110. For this reason, the normal voltage range is the high level (FIG. 2: A).

In a case where the voltage signal is out of this normal voltage range (S202: Yes), i.e., the voltage signal is at a level other than the high level, the control unit 150 determines that a malfunction has occurred in the relay control apparatus 100 (S203). The malfunction location may be, for example, a short-circuit malfunction of the relay close switch 121 of the relay close control unit 120, the relay open switch 131 of the relay open control unit 130, or the voltage detection switch 142 of the voltage detection unit 140.

When the voltage signal is not out of this normal voltage range (S202: No), i.e., when the voltage signal is at the high level, the voltage detection unit 140 is controlled to the ON state (S204).

In a case where no malfunction occurs in any of the functional units, a current flows from the power supply 301 to the ground through the power supply resistor 112 of the power supply control unit 110 and the voltage detection resistor 141 of the voltage detection unit 140, and the voltage detection unit 140 detects a voltage obtained by dividing the voltage of the power supply 301 according to the power supply resistor 112 and the voltage detection resistor 141. Accordingly, the normal voltage range is at the mid level (FIG. 2: B).

In a case where the voltage signal is out of this normal voltage range (S205: Yes), i.e., in a case where the voltage signal is at a level other than the mid level, the control unit 150 determines that a malfunction has occurred in the relay control apparatus 100 (S206). For example, when the voltage signal is at the high level, the malfunction location may be short-circuit malfunction in the power supply switch 111 of the power supply control unit 110 or open malfunction in the voltage detection switch 142 of the voltage detection unit 140, and when the voltage signal is at the low level, the malfunction location may be short-circuit malfunction in the relay close switch 121 of the relay close control unit 120 or in the relay open switch 131 of the relay open control unit 130. Thereafter, the control unit 150 controls the voltage detection unit 140 to the OFF state (S207), and terminates the diagnosis mode.

When the voltage signal is not out of this normal voltage range (S205: No), i.e., when the voltage signal is at the mid level, the power supply control unit 110 is controlled into the ON state (S208).

In a case where no malfunction occurs in any of the functional units, a current flows from the power supply 301 to the ground through the power supply switch 111 of the power supply control unit 110 and the voltage detection resistor 141 of the voltage detection unit 140, and the voltage detection unit 140 detects a voltage substantially equal to the voltage of the power supply 301. Accordingly, the normal voltage range is at the high level (FIG. 2: C).

In a case where the voltage signal is out of this normal voltage range (S209: Yes), i.e., in a case where the voltage signal is at a level other than the high level, the control unit 150 determines that a malfunction occurs in the relay control apparatus 100 (S210). The malfunction location may be, for example, open malfunction in the power supply switch 111 of the power supply control unit 110 or in the voltage detection switch 142 of the voltage detection unit 140. Thereafter, the control unit 150 controls the power supply control unit 110 to the OFF state (S211), controls the voltage detection unit 140 to the OFF state (S207), and terminates the diagnosis mode.

In the processing during the diagnosis mode operation, the control unit 150 controls the power supply control unit 110 to the ON state (S208), but both of the relay close control unit 120 and the relay open control unit 130 are maintained to be controlled in the OFF state, and therefore, as long as the relay control apparatus 100 is in the normal state, the latching relay 200 would not perform an opening and closing operation.

When voltage signal is not out of this normal voltage range (S209: No), i.e., when the voltage signal is at the high level, the power supply control unit 110 is controlled to the OFF state (FIG. 5: S212). Then, the relay close control unit 120 is controlled to the ON state (S213).

In a case where no malfunction occurs in any of the functional units, a current flows from the power supply 301 to the ground G through the power supply resistor 112 of the power supply control unit 110, the closing side coil 201, and the relay close switch 121 of the relay close control unit 120, and the voltage detection unit 140 detects a voltage substantially equal to the voltage of the ground G. Accordingly, the normal voltage range is at the low level (FIG. 2: D).

In a case where the voltage signal is out of this normal voltage range (S214: Yes), i.e., in a case where the voltage signal is at a level other than the low level, the control unit 150 determines that a malfunction has occurred in the relay control apparatus 100 (S215). The malfunction location may be, for example, open malfunction in the relay close switch 121 of the relay close control unit 120. Also, there is a possibility of open circuit and the like in the closing side coil 201. Accordingly, open circuit in the closing side coil 201 may also be determined in the malfunction determination. Thereafter, the control unit 150 controls the relay close control unit 120 to the OFF state (S216), and controls the voltage detection unit 140 to the OFF state (S207), and terminates the diagnosis mode.

In the processing during the diagnosis mode operation (S213), the control unit 150 controls the relay close control unit 120 to the ON state, but controls the power supply control unit 110 to the OFF state, and therefore, as long as the relay control apparatus 100 is in the normal state, the power supply resistor 112 does not allow a current sufficient for operating the latching relay 200 to flow through the closing side coil 201, so that the latching relay 200 would not perform the closing operation.

When the voltage signal is not out of this normal voltage range (S214: No), i.e., when the voltage signal is at the low level, the relay close control unit 120 is controlled to the OFF state (S217). Then, the relay open control unit 130 is controlled to the ON state (S218). It should be noted that the order of the diagnosis performed with the ON control of the relay close control unit 120 (S213) and the diagnosis performed with the ON control of the relay open control unit 130 (S218) may be reversed.

In a case where no malfunction occurs in any of the functional units, a current flows from the power supply 301 to the ground through the power supply resistor 112 of the power supply control unit 110, the opening side coil 202, and the relay open switch 131 of the relay open control unit 130, and the voltage detection unit 140 detects a voltage substantially equal to the voltage of the ground. Accordingly, the normal voltage range is at the low level (FIG. 2: E).

In a case where the voltage signal is out of this normal voltage range (S219: Yes), i.e., in a case where the voltage signal is at a level other than the low level, the control unit 150 determines that a malfunction has occurred in the relay control apparatus 100 (S220). The malfunction location may be, for example, open malfunction in the relay open switch 131 of the relay open control unit 130. Also, there is a possibility of open circuit and the like in the opening side coil 202. Accordingly, open circuit in the opening side coil 202 may also be determined in the malfunction determination. Thereafter, the control unit 150 controls the relay close control unit 120 to the OFF state (S221), controls the voltage detection unit 140 to the OFF state (S207), and terminates the diagnosis mode.

In the processing during the diagnosis mode operation (S218), the control unit 150 controls the relay open control unit 130 to the ON state, but controls the power supply control unit 110 to the OFF state, and therefore, as long as the relay control apparatus 100 is in the normal state, the power supply resistor 112 does not allow a current sufficient for operating the latching relay 200 to flow through the opening side coil 202, so that the latching relay 200 would not perform the opening operation.

When the voltage signal is not out of this normal voltage range (S219: No), i.e., when the voltage signal is at the low level, no malfunction occurs in the relay control apparatus 100, and all of the power supply control unit 110, the relay close control unit 120, the relay open control unit 130, and the voltage detection unit 140 are determined to be normal (S222).

Thereafter, the control unit 150 controls the relay open control unit 130 to the OFF state (S223), controls the voltage detection unit 140 to the OFF state (S224), and terminates the diagnosis mode. After the diagnosis mode is terminated, the control unit 150 transitions to the normal operation.

As described above, when the relay control apparatus 100 according to the present embodiment has such a configuration that, when the diagnosis is performed by driving the relay close control unit 120 and the relay open control unit 130 to the ON state, the power supply control unit 110 can be controlled into the OFF state, and therefore, the opening and closing operation of the latching relay 200 can be alleviated.

Figure 5:
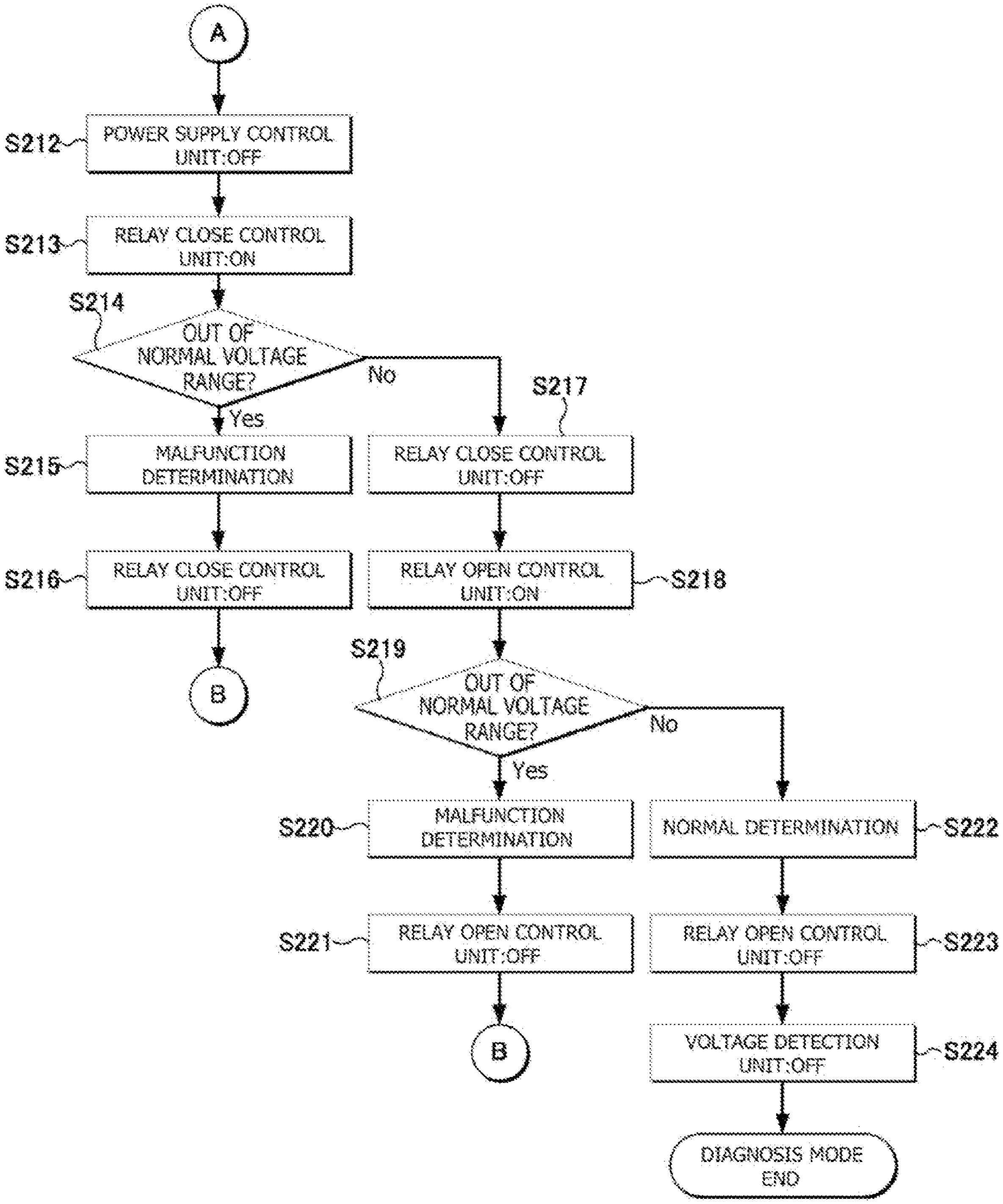
FIG. 5 is a flowchart illustrating the diagnosis mode operation of the relay control apparatus.

The procedure of the malfunction diagnosis illustrated in FIG. 4 and FIG. 5 are only examples, and the malfunction diagnosis may be performed according to other procedures. Also, although the voltage detection unit 140 has been described as a functional unit separate from the control unit 150, the voltage detection unit 140 may be included in the control unit 150.

LIST OF REFERENCE SIGNS

100 relay control apparatus
110 power supply control unit
111 power supply switch
112 power supply resistor
120 relay close control unit
121 relay close switch
130 relay open control unit
131 relay open switch
140 voltage detection unit
141 voltage detection resistor

142 voltage detection switch
150 control unit
200 latching relay
201 closing side coil
202 opening side coil
301 power supply

What is claimed is:

1. A relay control apparatus for receiving a supply of power and controlling a latching relay including a closing side coil and an opening side coil, the relay control apparatus comprising:

a power supply control unit including a power supply resistor and a power supply switch connected in parallel between a first electrode and a connection point between a first end of the closing side coil and a first end of the opening side coil;

a relay close control unit including a relay close switch connected between a second electrode and a second end of the closing side coil;

a relay open control unit including a relay open switch connected between the second electrode and a second end of the opening side coil;

a voltage detection unit including a voltage detection resistor and a voltage detection switch connected in series between the connection point and the second electrode, the voltage detection unit being configured to output a voltage signal based on a voltage of the connection point; and a control unit configured to output a power supply signal for controlling ON/OFF of the power supply switch, a relay close signal for controlling ON/OFF of the relay close switch, a relay open signal for controlling ON/OFF of the relay open switch, and a detection signal for controlling ON/OFF of the voltage detection switch, the control unit being configured to detect malfunction based on the power supply signal, the relay close signal, the relay open signal, the detection signal, and the voltage signal, wherein the control unit has a diagnosis mode, and the control unit is configured to change the power supply signal to an OFF state in a case where, in the diagnosis mode, the relay close signal is changed to an ON state or the relay open signal is changed to an ON state.

2. The relay control apparatus according to claim 1, wherein a normal voltage range is defined for each combination of states of the power supply signal, the relay close signal, the relay open signal, and the detection signal, and in a case where the voltage signal is determined to be out of the normal voltage range, the control unit determines an occurrence of malfunction.

3. The relay control apparatus according to claim 1, wherein the power supply resistor has such a value that a current is limited to such a degree that the latching relay does not operate even when the relay close switch or the relay open switch is switched to an ON state while the power supply switch is in an OFF state.

4. The relay control apparatus according to claim 1, wherein the control unit is configured to change the power supply signal to an ON state in a case where, in a mode other than the diagnosis mode, the relay close signal is changed to an ON state or the relay open signal is changed to an ON state.

* * * * *